Sept. 15, 1970   H. J. REINKE   3,529,221
SOLID STATE STARTING CIRCUIT FOR ELECTRIC MOTORS
Filed Aug. 8, 1968

INVENTOR
HERBERT J. REINKE
BY Wheeler, Wheeler, House & Clemency
ATTORNEYS

United States Patent Office 3,529,221
Patented Sept. 15, 1970

3,529,221
SOLID STATE STARTING CIRCUIT
FOR ELECTRIC MOTORS
Herbert J. Reinke, 2220 S. 82nd St.,
Milwaukee, Wis. 53219
Filed Aug. 8, 1968, Ser. No. 751,177
Int. Cl. H02p 1/44
U.S. Cl. 318—221                                    3 Claims

ABSTRACT OF THE DISCLOSURE

This disclosure relates to a solid state starting circuit for electric motors in which the motor winding has multiple taps to which line voltage is selectively applied through triac switches, the gate circuits of which are subject to the control of a sensor responsive to motor speed.

BACKGROUND OF THE INVENTION

Prior art devices for starting shaded pole electric motors typically utilize a multiple tapped motor winding with a mechanical switch to shift the line voltage from a partial tap to a full tap as the motor approaches running speed. In one such device known to me, the mechanical switch is actuated by a relay switch having a coil controlled by an S.C.R., the gate circuit of which is controlled by a sensing coil in inductive relation to the motor winding so as to turn on the S.C.R. and energize the realy coil as the motor approaches running speed. This prior art device is subject to problems associated with mechanical switching and relay components having limited life, plus the usual maintenance problems. The mechanical switching arrangement is also characterized by slow time reaction to the sensing coil.

SUMMARY OF THE INVENTION

In accordance with the present invention, the mechanical switch, relay coil, and S.C.R. are replaced by a completely solid state starting circuit incorporating two triac switches. One traic switch is in the power circuit to the mid tap of the motor coil and the other triac switch is in the end tap of the motor coil. Accordingly, current is supplied to the motor coil through whichever one of the two triacs is turned on.

Swtiching between the two triacs is accomplished in a novel circuit arrangement between the two triacs in which the triac in the circuit to the end tap is in parallel with the gate circuit of the triac which is in circuit to the mid tap. The gate circuit of the triac in the circuit to the end tap responds to the signal from the sensing coil.

Accordingly, the power source energizes the motor winding through the first triac until a sensor triggers the second triac, whereupon the first triac is turned off and the motor winding is energized through the second triac. The circuit of the present invention has the advantage of self-regulation because if the motor is subject to heavy load, so as to reduce its speed, the signal from the sensing coil will drop to the point where the second triac will turn off, thus triggering the gate circuit of the first triac to turn it back on and energize the motor winding through the mid tap to re-impose starting torque on the motor and tend to bring it back up to speed.

The triac switching time is much less than the mechanical response of the relay contacts. This avoids the problem in which time delay in the relay may cause the motor to slip down the torque curve under load.

Other objects, features, and advantages of the invention will appear from the following disclosure.

DESCRIPTION OF THE DRAWINGS

FIG. 1 is a circuit diagram of the prior art circuit above referred to.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
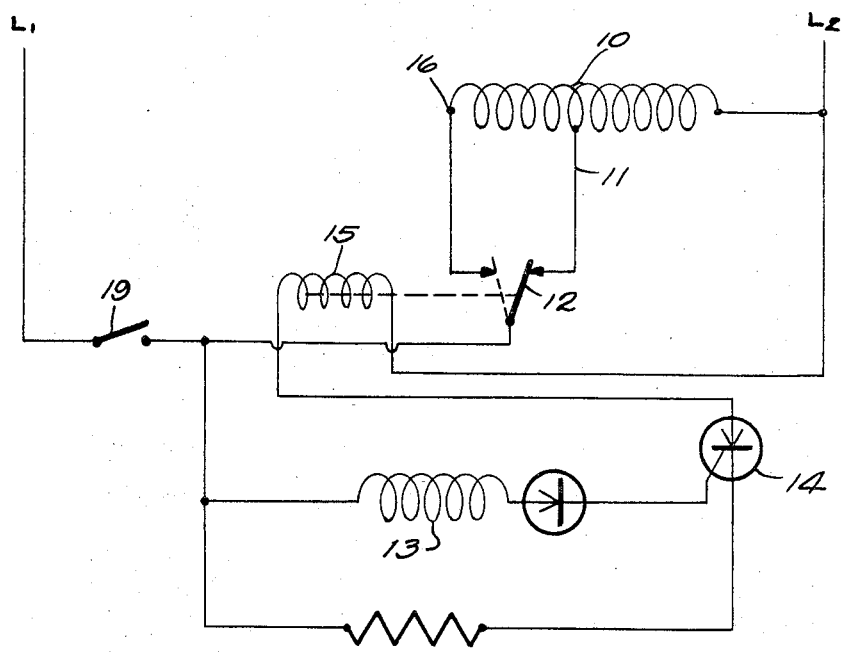

The prior art circuit is shown in FIG. 1. The shaded pole motor has a winding 10 with multiple taps including an end tap 16 and a mid tap 11. Starting torque for the motor is generated when mechanical relay operated switch 12 is in its normally closed position, as shown in full lines in FIG. 1. The motor will tend to come up to speed when line switch 19 is closed to place motor coil 10 in circuit between power source lines $L_1$ and $L_2$, through mid tap 11. A sensor, such as sensing coil 13 is disposed in inductive relation to the motor coil 10 to signal the tap switch control element 14 as hereinafter described. As the motor comes up to speed, voltage is induced in the sensing coil 13 which triggers the gate of tap switch control S.C.R. 14, thus to energize relay coil 15. When relay coil 15 is energized, it will pull tap switch 12 to its dotted line position shown in FIG. 1 to disconnect the mid tap 11 and energize coil 10 through its end tap or terminal 16. Thereafter, the motor runs under full power.

Accordingly, in the prior art circuit of FIG. 1, a relay coil 15 is used to switch the motor from its starting winding through mid tap 11 to its running winding through end tap 16.

Figure 2:
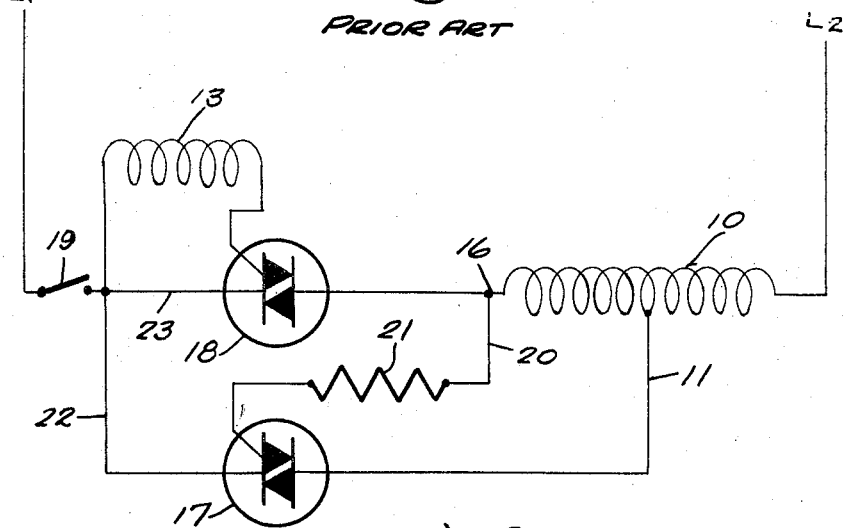
FIG. 2 is a circuit diagram embodying the present invention.

A circuit embodying the invention is shown in FIG. 2 in which the motor components are given the same reference characters. In this circuit two triacs 17 and 18 are utilized in place of the mechanical switch 12, relay coil 15 and S.C.R. 14 of the prior art circuit of FIG. 1. When line power switch 19 is closed to start the motor, the gate of triac 17 is energized from $L_2$ through the motor winding 10 and resistor 21. Current then flows through the triac 17 to energize the motor through mid tap 11 to impose starting torque on the motor. Such current as flows through the gate circuit of triac 17 through line 20 is so limited by the resistor 21 as to have no substantial effect on the motor.

When the motor comes up to speed, the sensing coil 13 will develop a voltage sufficient to turn on triac 18. This completes the circuit through lines 22, 23 to the end terminal 16 of the motor and, at the same time, shorts the gate of triac 17 to turn off triac 17, thus opening the circuit to the motor winding mid tap 11. Now all current for the motor winding 10 flows to it through the end terminal 16.

Figure 3:
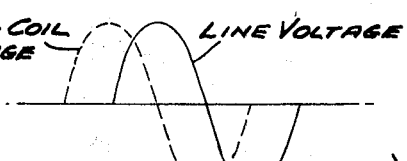
FIG. 3 is a graph comparing line voltage to sensing coil voltage in the circuit of FIG. 2.

The voltage across the sensing coil 13 is 90° out of phase with the line voltage which is also the voltage across the winding 10, as is shown in FIG. 3. Accordingly, the triac 18 is turned on at precisely the point in the cycle to turn off the triac 17 at the phase point when line voltage is zero.

If the motor is subject to heavy loads, so as to reduce its speed, the voltage across the sensing coil 13 will drop to the point where triac 18 will be turned off, thus removing the short across the gate of triac 17 and turning triac 17 back on. This reconnects mid tap 11 of motor winding 10 to impose starting torque on the motor and tends to bring it back up to speed.

The circuit of FIG. 2 is better than the circuit of FIG. 1 because it eliminates mechanical switching and relay components, thus reducing maintenance and increasing the life of the circuit. The circuit of FIG. 2 also has the advantages of self-regulation and faster time response.

I claim:

1. In a solid state starting circuit for an electric motor connected to a power source and having a multiple tap motor winding, a sensor responsive to the field about the motor winding and a tap switch responsive to the sensor to switch the tap through which the motor winding is energized from said power source in accordance with sensor signals, the improvement in which:

said tap switch comprises a first triac in a line from the power source to one tap on the motor winding and a second triac in a line from the power source to another tap on the motor winding, said first triac having a gate circuit in parallel with the second triac, said second triac having a gate circuit triggered by the sensor, whereby said power source energizes the motor winding through said first triac until the sensor triggers the second triac, whereupon the first triac is turned off and the motor winding is energized through the second triac.

2. The starting circuit of claim 1 in which said second triac constitutes means for selectively short circuiting the gate of the first triac in response to sensor signals, for self-regulation of motor speed.

3. The starting circuit of claim 1 in which the sensor comprises a coil in inductive relation to the motor winding, the voltage induced in said sensor coil being 90° out of phase with the line voltage, whereby the second triac is turned on at the instantaneous time point in the power cycle when the instantaneous voltage on the first triac is zero.

References Cited

UNITED STATES PATENTS

| | | | |
|---|---|---|---|
| 2,705,770 | 4/1955 | Suhr | 318—223 XR |
| 3,325,712 | 6/1967 | Stone et al. | 318—225 XR |

ORIS L. RADER, Primary Examiner

G. Z. RUBINSON, Assistant Examiner

U.S. Cl. X.R.

318—222, 227, 345